Sept. 22, 1942.  C. H. MEKEEL, JR  2,296,532
TORQUE CONTROLLED TRANSMISSION
Filed Dec. 19, 1939  7 Sheets-Sheet 1

Inventor
Charles H. Mekeel Jr.
by Attorneys

Inventor
Charles H. Mekeel Jr.
by Wm Steell Jackson and Son
Attorneys.

Patented Sept. 22, 1942

2,296,532

UNITED STATES PATENT OFFICE 2,296,532

TORQUE-CONTROLLED TRANSMISSION

Charles H. Mekeel, Jr., Reading, Pa.

Application December 19, 1939, Serial No. 309,965

32 Claims. (Cl. 74—259)

My invention relates to torque-operated transmissions intended specially for motor-operated vehicles but available also in operation of machinery requiring variable speeds and having appreciable momentum.

The main purpose of my invention is to simplify the mechanism thereby reducing construction and repair costs and also improving the ruggedness of the mechanism.

A further purpose is to use torque between parts of a coupling control for planetary gear sets for the purpose of clutching and declutching the casings with the shafts of the planetary gears in a predetermined order.

A further purpose is selectively to operate different change speed sets at their different speeds, effecting the selection by torque provided in the case of speed reduction by the engine drive and in the case of speed increase by the momentum of the vehicle.

A further purpose is to control the positions of the parts of planetary speed-changing units by torque-operated clutching and declutching for direct-connecting through the units or driving through rotation of the planets of the units.

A further purpose is to provide a torque-controlled coupling having overrunning parts limited to a partial turn of relative movement and a speed change mechanism whose speed position is determined by the setting or release of a clutch.

A further purpose is to divide lost motion ratchet and latch movement between cam carrying parts and to use the cams for operating clutching and declutching mechanisms.

A further purpose is to provide a driving disc having relative angular movement with respect to a latch carrier, using angular movement to withdraw the latches, to operate a cam for clutching and declutching change speed mechanism by the latch carrier and to provide an overrunning clutch for the latch with a second cam to clutch and declutch a second change gear by the second cam.

A further purpose is to clutch and declutch change gear mechanism by cams with an intervening follower using one cam to operate the follower and the second to operate the clutching and declutching mechanism.

A further purpose is to provide a plurality of speed-change sets with overrunning clutch torque control for the position of the parts in the individual sets by which the sets are all direct connected, all in speed reduction positions or in different combinations of these.

A further purpose is to provide planetary gearing sets of different ratios with an automatic torque-operated control whereby the planetary sets are operated successively as units or through planet rotation, producing different speeds, and differences in speed ratios of the planetary gears are used to effect further speed variations.

A further purpose is automatically to increase speed in gearing through clutching and unclutching planetary gearing through torque due to car movement, and to reduce speed in gearing through torque due to engine drive, the amount of resistance met during reduction of speed being determinative of the extent to which change is made.

A further purpose is to effect clutching and declutching of one part to another selectively in two planetary gear sets of different planet ratios, whereby the planetary gears successively are connected to drive by direct connection or through their planets, connecting both as units for high speed, both through their planets for low speed and declutching one or other of the different ratio planetaries, but not both to get two intermediate driving ratios. Clutching and declutching are effected by torque-operating through an angular slip provided between the engine shaft and the transmission shaft.

A further purpose is to use overrunning clutch engagements or releases and torque controlling means therefor to alter the setting of speed-change mechanisms.

A further purpose is to provide an overrunning clutch having biting contact in each of two directions of relative movement.

A further purpose is to provide an overrunning clutch having two relative directions of movement, biting engagement in one direction or the other depending upon the conditions under which the clutch is driven and with torque-controlled release for one of the biting engagements.

A further purpose is to release the bit or wedge action of an overrunning clutch by countermovement of one of the parts with respect to the other and subsequently to hold the parts against bite engagement.

A further purpose is to change gear ratios automatically, for increase using torque due to car momentum and for reduction using torque due to engine drive, and centrifugally to limit the speed at which change can be effected.

Further purposes will appear in the specification and in the claims.

My invention relates not only to the methods involved but to the mechanism by which these methods can be carried out.

I have preferred to illustrate one main form of my mechanism only with variations in the way in which it can be carried out, selecting this form not only for the reason that it is practical, effective, simple and inexpensive but primarily because it well illustrates the principles involved.

Figure 3 is a perspective view of the control unit shown in the central part of Figure 2.

Figure 4 is a perspective of the separate parts entering into the control unit of Figure 3, shown spaced one from another in the general order in which they occur along the axial length of the structure in Figure 3.

Figures 5, 6, 7 and 8 are sections upon line 5—5 in Figure 2, taken in the direction of the arrows to the left. Some of the parts are omitted for clearness, as is true also of various other figures. The four figures indicate different positions occupied by the parts at different times in operation of the mechanism.

Figure 5a is a perspective view of a cam follower block seen in Figure 5 and in other figures.

Figures 9, 10, 11 and 12 are sections upon lines 9—9, 10—10, 11—11 and 12—12 respectively in Figures 5, 6, 7 and 8.

The section line 5—5 is shown also in Figure 4, with the correction however that the section passes through a ratchet ring which is out of place in this figure from the section standpoint.

Figure 22 is a diagrammatic view corresponding generally to the section of the control coupling but altered therefrom to show as integral parts which are rigid and so move together in other views.

Figure 23 is a diagrammatic view giving a portion of the structure only and indicating successive latch block positions for a quarter-turn of the parts during the changing of the speed ratios.

In the drawings similar numerals indicate like parts.

My invention is intended to supply a pair of speed-changing units or sets each having two speeds, the ratios being different, with a torque-control coupling in which torque from the engine or from momentum of the mechanism driven (under the control of the operator through use of the accelerator) selects the speed of the units and connects them in the driving train in a predetermined order.

The invention is capable of application to gas, steam or electric driving mechanisms of any type in which there is a momentum of the parts driven capable of use to develop torque as the speed of the driving motor is reduced. It will probably find its largest use in the internal combustion motor field, including pleasure automobiles, trucks, buses and rail cars.

The simple form of planetary gearing having its two settings clutched for direct drive and declutched (clutch released) for speed reduction has been illustrated as the best speed changing mechanism for the purpose. The construction is preferably such that standard types of overrunning clutches, latches, etc., may be used.

Figure 1:
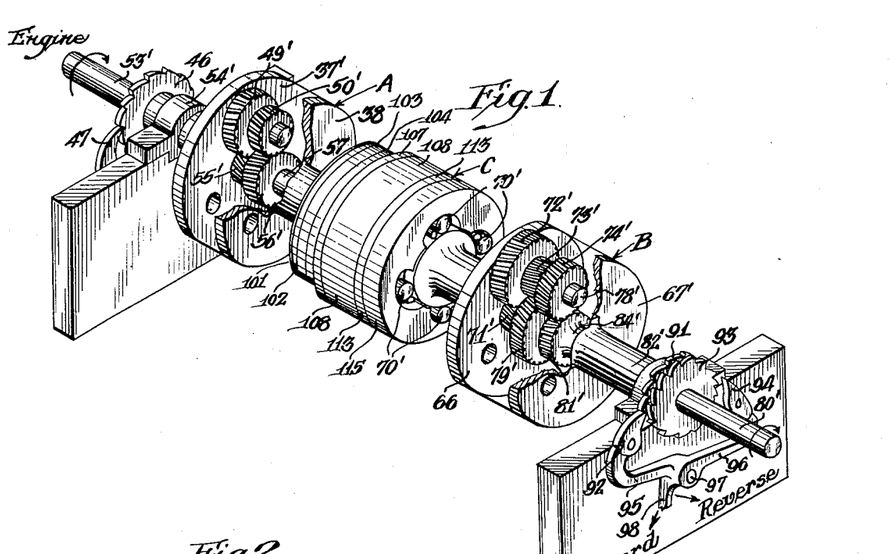
Figure 1 is a diagrammatic perspective view intended to assist in illustration of my invention.
Figures 4, 5, 22, 23:
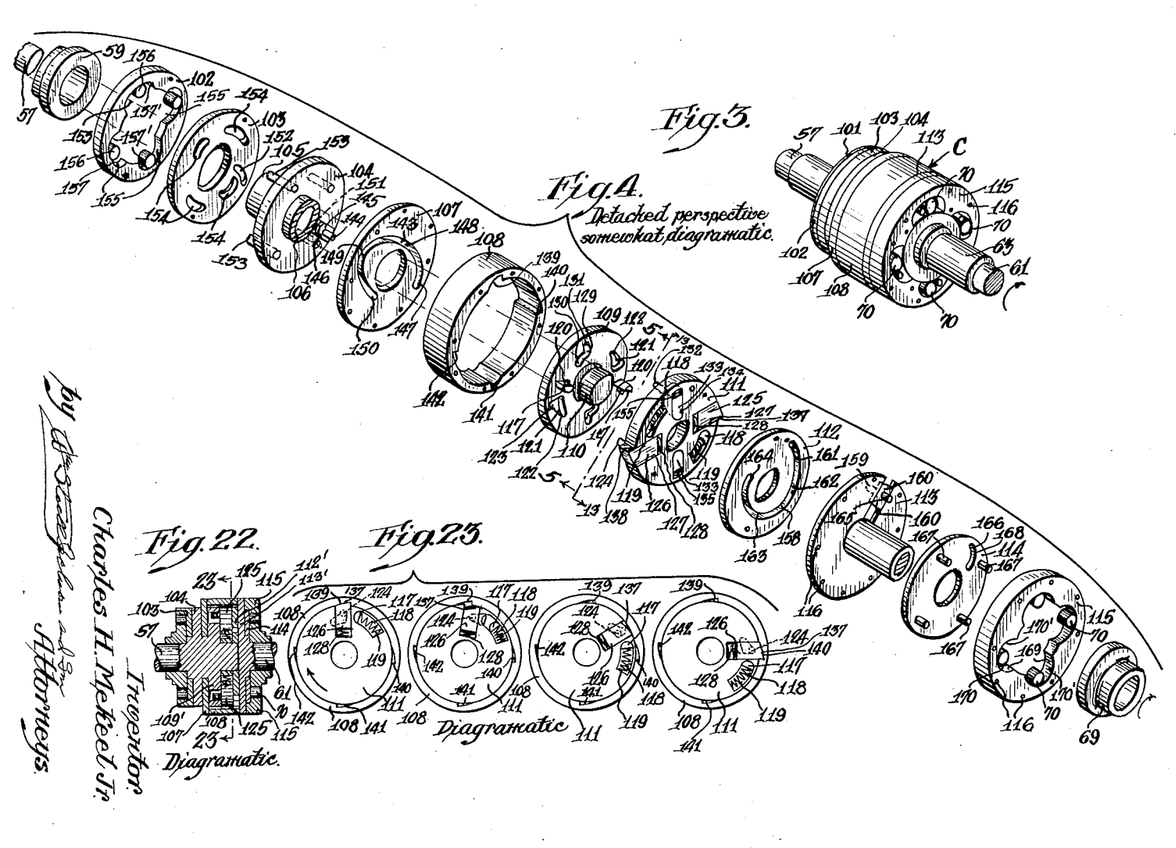
Figure 5:
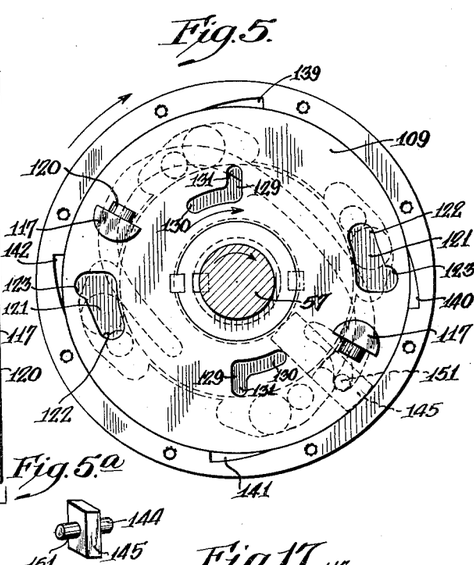
Figure 6:
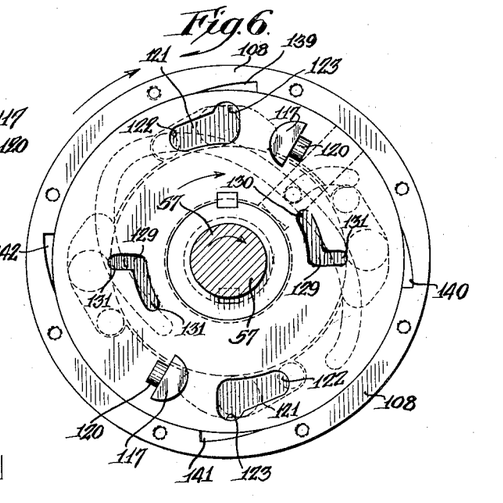
Figures 7, 11:
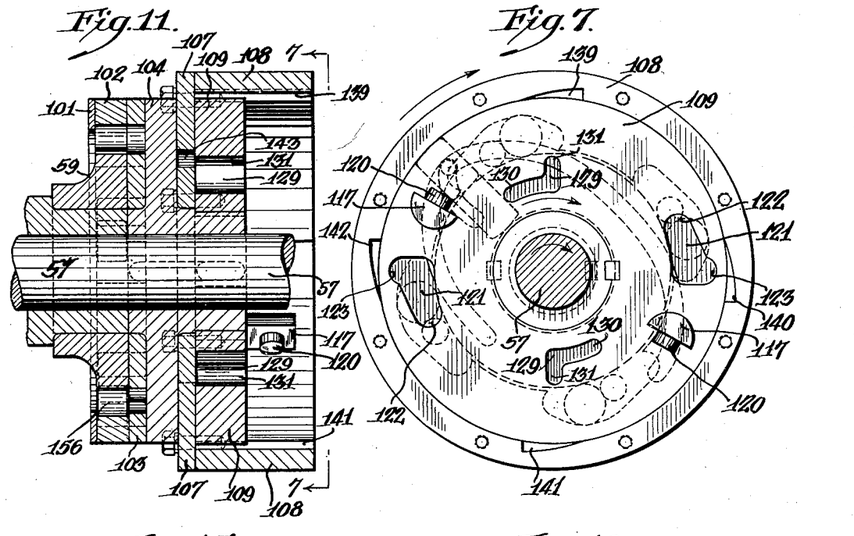
Figure 8:
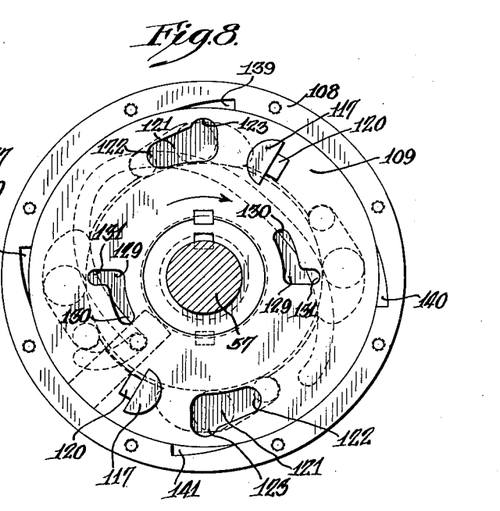

The structure in Figures 1 and 22 are more or less diagrammatic and do not correspond fully with the structure in the other figures and for this reason the reference characters used in them will be, as far as shown, those of the other figures but with different indices.

The two planetary gear units or sets A and B are in general alike, the differences being chiefly that they have different gear ratios between the sun and planet gears and that to the set B has been added reversing mechanism within the same casing. To make the illustration more simple one set of planets only is shown in most of the figures, the other set or sets used to balance being omitted.

The two planetary gear sets and the torque control coupling C between them are all protected within a housing 35 joined with other rigid parts of the engine by a wall 36.

The planetary set A includes a casing disc 37 upon which is mounted a shell 38 to form a casing 39 enclosing and supporting the planet gears. An end of the disc has bearing at 40 and carries a ring 41 of which a surface 42 forms the inner race 43 for an overrunning reaction clutch-like brake. Between the outer race in housing 35 and the inner race are placed rollers 44. A cover plate 45 retains the rollers.

The setting of the brake is such as to prevent backward movement of the casing so as to afford reaction for planet gear operation. The corresponding function for set A is performed in Figure 1 by ratchet disc 46 and latch 47.

Figures 2, 21:
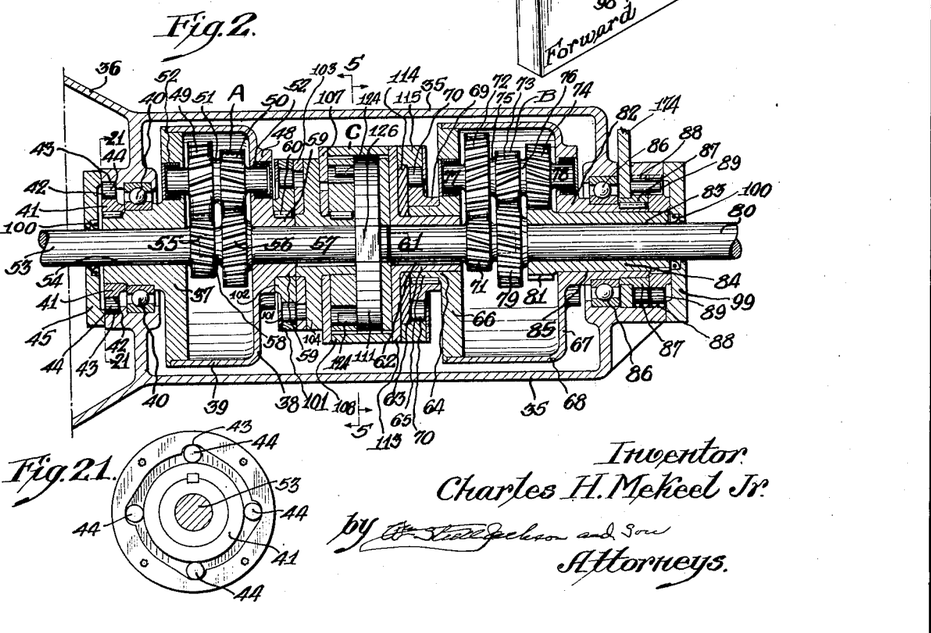
Figure 2 is a longitudinal section through the center of a structure embodying a slightly different form of the invention from that shown in Figure 1.
Figure 21 is a fragmentary section taken upon line 21—21 of Figure 2.

In the figures shaft rotation has been assumed to be counterclockwise when viewed from the left end in Figures 1, 2 and 3.

Between the disc 37 and the thickened face 48 of the shell are mounted planet gears 49 and 50 rigidly united by a neck 51, all turning in any suitable bearings 52 in the disc and shell.

The engine (not shown) is connected through a suitable engine clutch (not shown) with a driving shaft 53 having bearing at 54 within the disc 37 and carrying the driving sun gear 55 which engages with planet gear 49. Driven planet gear 50 engages with a driven sun gear 56 upon a shaft 57 which may have end thrust bearing at 58 against the end of shaft 53.

The face 48 of the shell carries a flange 59 which lies at that end of the unit or set adjacent the coupling, which is shown as keyed to it at 60 and which, as hereinafter more fully pointed out, forms the inner member of a torque-controlled overrunning clutch.

The outer clutch member runs with the shaft 57 under control of the coupling, with the purpose and effect that clutching of the overrunning clutch drives the casing with the shaft in direct connection and at equal speed, whereas when the parts are unclutched the planetary gearing operates through rotation of the planet pairs about their own axes driving the shaft 57 at a lower rate of speed. The speed ratio in planetary set A when shaft 57 is driven through rotation of the planet gears is more nearly the same as that of direct connection than is the speed ratio in planetary set B when similarly operating through rotation of its planet gears.

In planetary set B some of the parts are arranged in opposite position as compared with corresponding parts in set A in order that the torque-controlled overrunning clutch member for set B may lie adjacent to the torque-control coupling.

The shaft 61, for reasons of manufacture keyed at 62 to a sleeve 63, normally is driven through the coupling. The sleeve has bearing at 64 within a disc collar extension 65 of the disc 66, forming with shell 67 a casing 68.

The disc 66 carries flange 69 forming the inner race of a clutch by which through rollers 70 this flange can be coupled to the shaft, being clutched or declutched by the coupling. The shaft 61 carries the normally driving sun gear 71 of the planetary gearing shown. This sun gear engages with a planet 72 of a unit of three planet gears 72, 73, 74 shown in Figure 2 (two only when the reversing gear is located outside of this unit as in Figure 25) connected by necks 75 and 76 and supported by bearings 77, 78 in the disc and shell of the casing.

Planet 73 engages with a normally driven sun gear 79 upon transmission or delivery shaft 80. Because of the presence of the reversing planet gear 74 and its sun gear 81 the shaft 80 does not have bearing directly with the extension 82 of the shell but has its bearing at 83 within a sleeve 84 upon which sun gear 81 is carried. The sleeve 84 has bearing at 85 within the shell extension 82. The shell is supported in bearings 86 within the housing.

Figure 25:
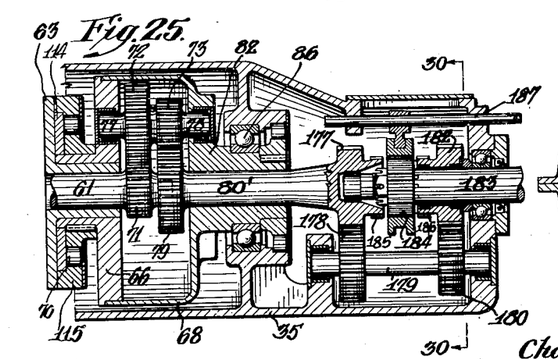
Figure 25 is a section corresponding generally to Figure 24 but removing reversing mechanism from inside the planetary set casing of Figure 24 and operating the reversing mechanism independently of the planetary section.
Figures 26A, 28, 29:
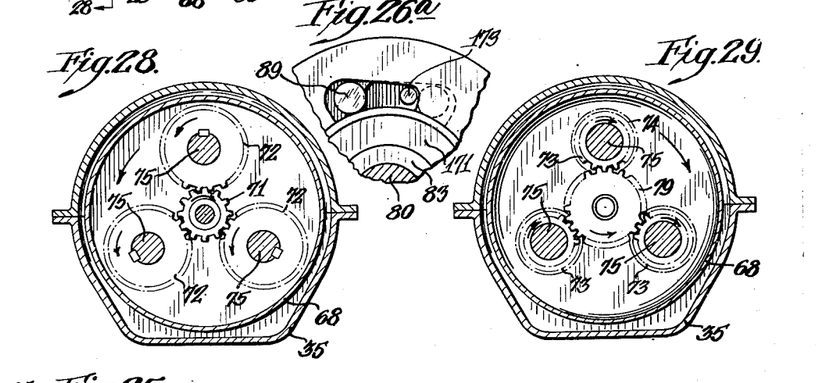
Figure 26a is a fragmentary enlargement of a portion of Figure 26, showing the clutch surfaces.
Figures 28 and 29 are sections corresponding to lines 28—28 and 29—29 in Figure 24.
Figure 30:
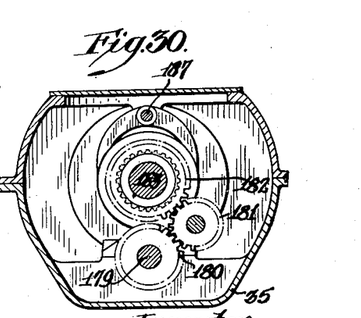
Figure 30 is a section upon line 30—30 of Figure 25.

The shell carries rigidly an inner race 87 which cooperates with an outer race 88 and rollers 89 to form a reaction overrunning clutch-like brake for this unit or set B speed change mechanism (see Figures 25 and 30).

Figures 24, 26, 27:
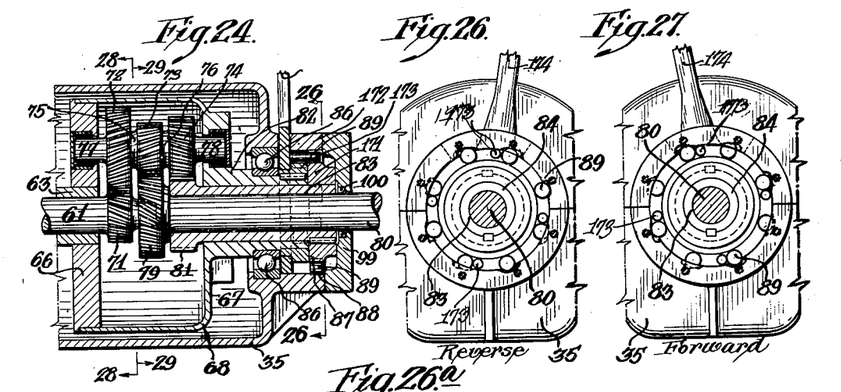
Figure 24 is a longitudinal section corresponding generally to the right-end of Figure 2.
Figures 26 and 27 are sections taken upon line 26—26 and showing different positions of the parts for forward and reverse driving connections.

As described more fully in connection with Figures 24, 26 and 27 a second overrunning clutch is provided in these figures and in Figure 2 with mechanism by which the reaction brake may be released when the second (reversing) brake is set, and vice versa.

The two brakes and their operating mechanisms are intended to be shown diagrammatically in Figure 1 where the reaction brake appears in ratchet wheel 91 and latch 92 and the reversing brake appears in the oppositely facing ratchet wheel 93 and latch 94. The two latches are supported by connected arms 95, 96 pivoted at 97 and operated by lever 98.

The brake structure in Figure 2 is closed by a plate 99. The plates 45 and 99 carry packing 100, engaging shafts 53 and 80.

The two sets or units shown as planetary gears comprise the best form known to me of change speed gearing in which two parts of the change speed can be gripped or clutched or otherwise coupled and released therefrom so as to provide for different speeds. Desirably direct drive is used in one form and a reduction drive in the other during which latter, in the planetary form, the planets rotate about their own axes. It is evident that the invention is independent of the type of such change speed gearing and comprises broadly torque-operated change of speed of change gear sets so that the sets may be coupled for direct drives, representing high, for combinations of direct and reduction drives for intermediates and reduction drives for low. Sub-combinations of this invention are considered to be broadly new.

Referring to Figure 4, shaft 57, or a sleeve surrounding and attached to it, passes through a clutch cover 101 (Figure 2), flange 59, clutch ring 102 and roller release plate 103 to cam follower guide 104 to which it, or in this case sleeve 105 keyed to it, is rigidly attached. The shaft and sleeve at 106 continue through a roller control cam disc 107 and into the interior of a ratchet ring 108 to connect rigidly with driving disc 109. The shaft projects beyond the disc at 110 to afford bearing for a latch carrier 111 and a second roller control cam disc 112.

The driving disc, latch carrier and ratchet ring are the main torque-controlled operating parts of the coupling and operate to the left in Figure 4 to clutch and declutch for unit A and to the right in this figure to clutch and declutch for unit B.

The driven shaft 61 or, more properly the hub sleeve 63 keyed to it, is rigidly connected to a second cam follower guide 113 and passes successively through a second roller release plate 114, a second clutch ring 115 and the flange 69 for unit B.

Clutch ring 102, roller release plate 103, cam follower guide 104 and roller control cam disc 107 cooperate to apply the torque-controlled movements of the ratchet ring, driving disc and latch carrier to clutching and declutching the appropriate parts of speed change unit A, whereas roller control cam disc 112, cam follower guide 113, roller release plate 114 and clutch ring 115 perform a similar function for speed change unit B.

Clutch ring 102 and roller release plate 103 are rigidly united to each other, as are cam follower guide 104, driving disc 109, drive shaft 57 from unit A and sleeve 105.

Driving disc 109, latch carrier 111 and roller control cam 112 all lie within the ratchet ring 108 and are capable of turning part of a rotation with respect to the ring, the latch carrier and cam being rigid with each other and the driving disc having slight capacity for angular movement with respect to them.

The ratchet ring is largely closed at one end by roller control cam disc 107 and at the other end by cam follower guide 113. Between this guide 113 and clutch ring 115, roller release plate 114 is free to turn slightly.

The ring 115 provides a cover for the plate 114 and is united to the cam follower guide, ratchet ring and roller control cam disc. The end of the clutch is protected by a plate 100. All of the parts which are indicated as rigidly united are secured together by suitable means, in most cases by screws or bolts passing through suitable openings 116, but are made separately because of convenience in manufacture or of assembly.

The direction of rotation assumed for convenience of reference to be counterclockwise as viewed from the left end of Figure 4 (see arrow) is the direction of movement of all of the structure; and where some parts are regarded as moving angularly with respect to others the movement is relative only. All move in the direction of the arrows in this figure.

Driving disc 109 carries driving lugs 117 projecting axially to enter circular slots 118 and engage compression springs 119 in these slots, so that the lugs drive the latch disc resiliently through these springs whenever there is enough resistance to driving for these springs to be compressed. Bosses 120 on the lugs enter the springs and center them. As with other parts of the construction the lugs are plural for strength and balance. In most of the figures where these springs should show one only is indicated in order not unduly to obscure the other illustration.

Balanced cam slots of two types are shown in the driving disc. Cam slots 121 have radially outer trailing cam surfaces 122 and retarding recesses or rests 123 at the outer leading ends of the cams, to receive and, against lower resistance pressures, to hold within these recesses studs 124 projecting axially from sliding latch blocks 125, 126 which are guided in slots 127 within latch carrier 111. The blocks are spring pressed radially outwardly by springs 128. Cams 122 are effective with angular leading movement of the disc with respect to the carrier to pull in the latches from their positions within the notches in the ratchet ring, as later more fully explained, to change the gear.

Slots 129 within the driving disc comprise two parts each. The radially inner trailing sections 130 are concentric with the driving disc and the connecting leading end portions 131 of these slots extend outwardly toward the outer rim of the disc. The slots receive axially extending fingers 132 rigid with blocks 133. The blocks slide within approximately radial guide slots 134 in the latch carrier. They are pressed inwardly by springs 135.

The blocks 133 operate by centrifugal force to prevent clutching or declutching action where the speed of the rotor is excessive. The fingers normally lie within the leading ends of the slots and, with excessive disc speed, lock against angular movement between the driving disc and the latch carrier. This prevents gear changing through angular movement between the driving disc and the latch carrier. With excessive speed the blocks 133 slide outwardly against the pressure of their springs, causing the fingers to enter the outer parts 136 of the leading ends of the slots and thus prevent relative angular movement of the driving disc and latch carrier. The driving disc cams 122 are thus prevented from acting upon studs 124 to retract the latch blocks.

From the latch disc position inside latch ring 108, the latch faces 137, 138 engage within different ratchet recesses 139, 140, 141, 142 within the interior surface of the ratchet ring. For a setting in which the flanges and shafts for both change gear sets are clutched, corresponding to high gear, latch face 137 fits within and engages ratchet opening 139. In the position of the parts in Figure 4 latch face 137 lies within ratchet opening 142, both flanges being declutched and the connections corresponding with low gear.

The step-by-step lost motion latch connection above described between shaft 57 as a driving shaft exerting engine torque and shaft 61 capable of exerting momentum torque when the engine drive is momentarily reduced is used to clutch and declutch the respective terminals of the change speed units A and B. They are shown as acting through somewhat different cams and connections for the two units, operating during lost motion advance of one shaft with respect to the other and when, by reason of the slip provided, the clutching parts are free from strain.

The cam slot 143 in roller control cam disc 107 carried by the ratchet ring and connected with shaft 61 engages and operates a driven follower pin 144 in a follower block 145 sliding in and out within a slot 146 in cam follower guide 104. The requisite angular movement between the disc and guide is due to the fact that the cam disc 107 is attached to the ratchet ring 108 and the guide is rigid with shaft 57.

In the Figure 4 position of the parts the shaft 57 and latch carrier have advanced three notches (desirably quadrants, and so shown) with respect to the ratchet ring in the direction of rotation of the parts, taking up all of the advance provided by the lost motion connection, placing pin 144 in the leading end 147 of cam 143. When the ratchet ring in turn advances step-by-step with respect to the latch carrier, as shortly described in explaining momentum torque change from "low" through two intermediate positions to "high," the block pin will occupy successively positions 148, 149 and 150, corresponding successively to location of latch 126 in notches 141, 140 and 139.

At the opposite side of block 145 from driven block pin 144 is located a driving pin 151 which rides within a preferably curved slot 152 in roller release plate 103. The slot 152 is generally diagonal to adjacent plate radii and its outer end, because of its diagonal direction leads its inner end.

Cam follower guide 104 carries roller release pins 153, each passing through a circularly extending slot 154 in plate 103 and entering the roller clutch space 155 adjacent to rollers 156. The positions of the pins trail the rollers.

Figure 9:
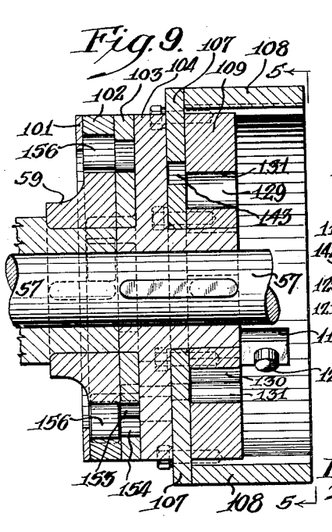
Figure 10:
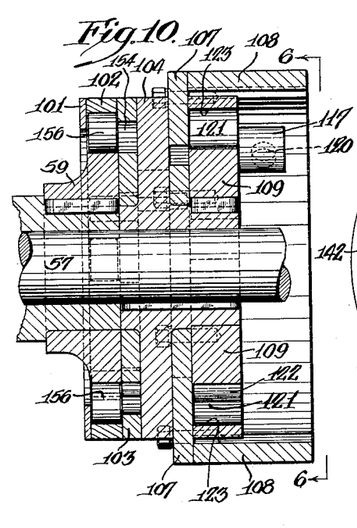
Figure 12:
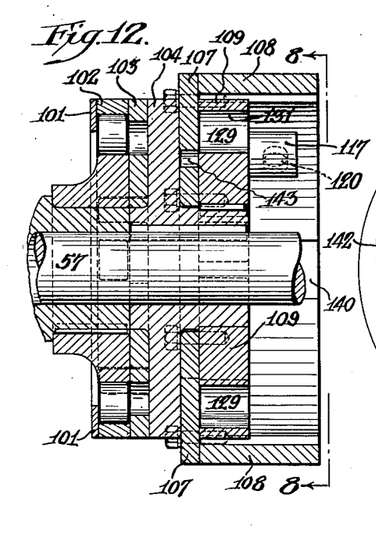

The positions of the parts appear in Figures 5 and 9.

With the block in the outer position shown the pins engage rollers 156 and hold them free from engagement against the clutching surfaces 157 of the clutch ring, i. e. in declutched position. When the block is moved to its inner position, corresponding to location of block pin 144 at 148 or 150 in slot 143, the travel of pin 151 in slot 152 advances roller release plate 103 and clutch ring 102, moving the rollers 156 away from the pins and permitting the rollers to wedge against the surfaces 157, i. e. provides clutching of the inner race 59. Block pin positions 147, 148, 149 and 150 in cam 143 therefore represent respectively declutched, clutched, declutched and clutched conditions of unit A and show in Figures 5 and 9, 6 and 10, 7 and 11, and 8 and 12.

The clutches used are double in that a second set of clutching surfaces 157' preferably within the clutch ring is engaged by rollers 156 when the parts are driven by momentum torque communicated through the coupling. It is characteristic of the form of planetary gearing shown that when drive is attempted through the normally driven or larger sun gear the effect is to rotate the casing and at a faster speed, revolving the planet gears around the sun gears and also rotating them but imparting no power. To prevent this and offer resistance to the torque movement such that the ratchet ring will over-ride the latch carrier, the flange and shaft of unit A are connected as a unit through this second clutching surface 157'.

Taking up the connections for gear change set B in Figure 4 (Figures 13 and 17), the roller control cam disc 112 is rigidly connected with and, therefore, rotates with the latch carrier. The disc contains a cam slot 158 turning relatively to cam follower guide 113 and to ratchet ring 108 at the same rate and time and to the same extent as cam follower guide 104 turns with respect to cam 143. The two cams are oppositely arranged about their axes.

In the position of the parts in Figure 4, one (the trailing) cam slot terminal near the periphery is engaged by driven follower pin 159 in follower block 160. The follower block slides in and out within a slot 146'.

For convenience considering the ratchet ring as stationary, angular movement of the latch carrier 111 and roller cam disc 112 from "low" gear position as shown, through the intermediates to "high" gear advances the cam slot 158 over the pin 159 successively from this cam slot terminal at 161 through quadrant positions 162, 163 to the leading terminal 164.

On the opposite face from pin 159 block 160 carries a driving follower block pin 165 which engages within the outer part 166 of a slot 168, preferably curved and extending diagonally to adjacent radii in roller release plate 114. Roller control pins 167 are carried by plate 114 and into roller spaces 169 in the clutch ring 115.

In the position of the parts shown in Figure 5 (Figures 13 and 17) pin 165 lies in the outer part of slot 166 and the pins 167 engage the rollers 70 to hold them out of engagement with clutch surfaces 170. The parts are declutched. Additional clutch surfaces 170' grip the rollers 70 when momentum drive dominates. Just as in unit A, rotation of the casing B must be stopped by clutching action at the instant the drive is reversed by momentum. Additional clutching surfaces 170' perform the same function as in unit A, locking casing B to the shaft of B so that unit B operates as a shaft to drive the ratchet ring through its lost motion movement changing the speed connections from lower to higher speed.

In both clutch ring constructions the two clutching functions preferably occur within the same ring, though obviously one-way clutches could be provided in separate rings, one of which using roller release means such as the pins shown and the other of which, corresponding to surfaces 157' and 170', not having any such release.

Inward movement of the pin 165 will move the roller release plate circumferentially in a movement relatively trailing that of the other parts. Plate 114 is free to move with respect to the ring 115. Pins 167 carried by this plate therefore withdraw from engagement with rollers 70, allowing the rollers to clutch.

Figure 13:
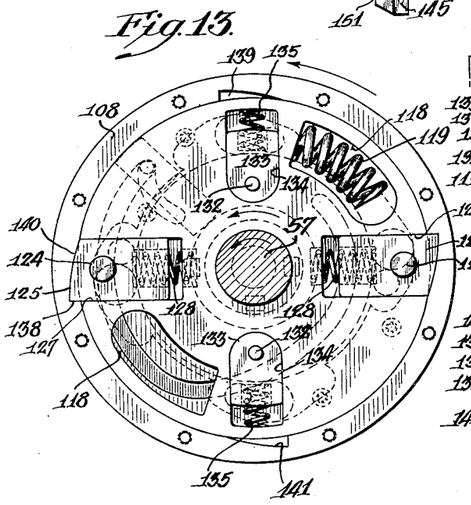
Figures 13, 14, 15 and 16 are sections taken upon line 5—5 in Figure 2 looking the direction of the arrows to the right and showing variant positions occupied by the parts during the operation of the control device.
Figure 17:
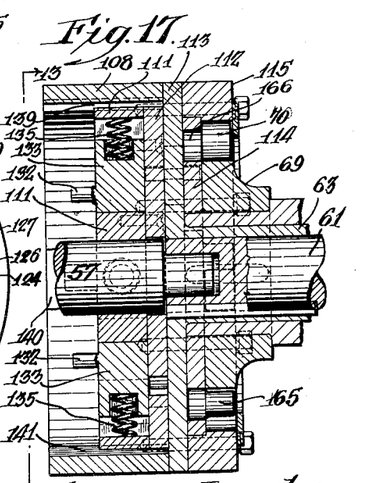

Continuing the convention that ring 108 is stationary—when pin 144 lies in positions 147 of slot 143 (Figures 5 and 9) causing declutching of unit or set A, pin 159 lies in position 161 of slot 158 causing declutching of unit B (Figures 13 and 17).

Figure 14:
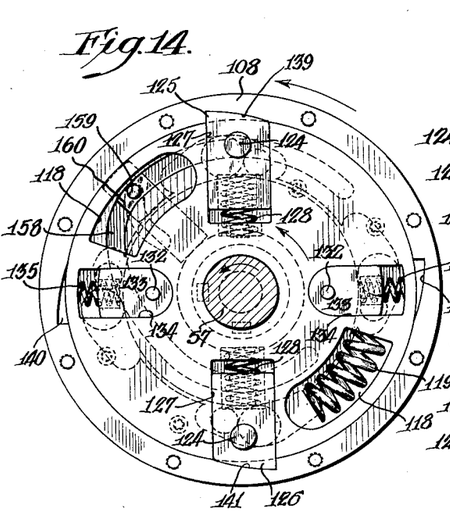
Figure 18:
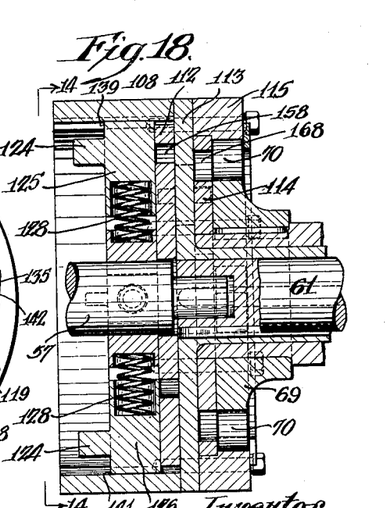

During the first quadrant travel of pin 144 in slot 143 to clutching (radially inner) position 147 for the lower intermediate speed, (Figures 6 and 10), cam slot 158 moves over pin 159 until the pin rests at 162, (Figures 14 and 18), an outer and therefore declutching position for control of the unit or set B.

Figure 15:
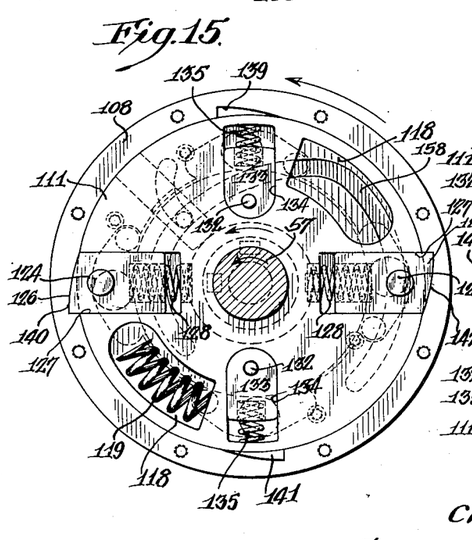
Figure 19:
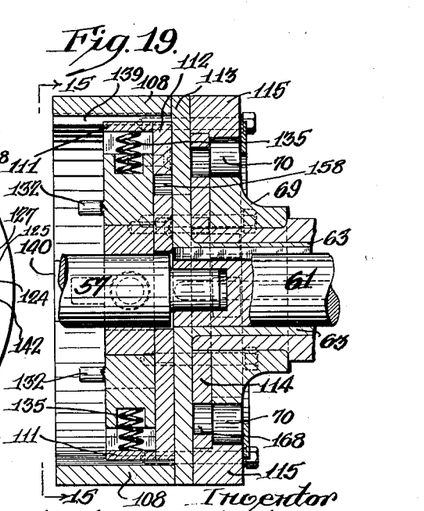

During travel of pin 144 in slot 143 for the following quadrant the pin is moved to position 149, a radially outer position of the parts for this higher intermediate connection (Figures 7 and 11), pin 159 correspondingly occupying a radially inner position 163 in slot 158 (Figures 15 and 19). Unit A is therefore declutched and unit B is clutched.

Figures 16, 20:
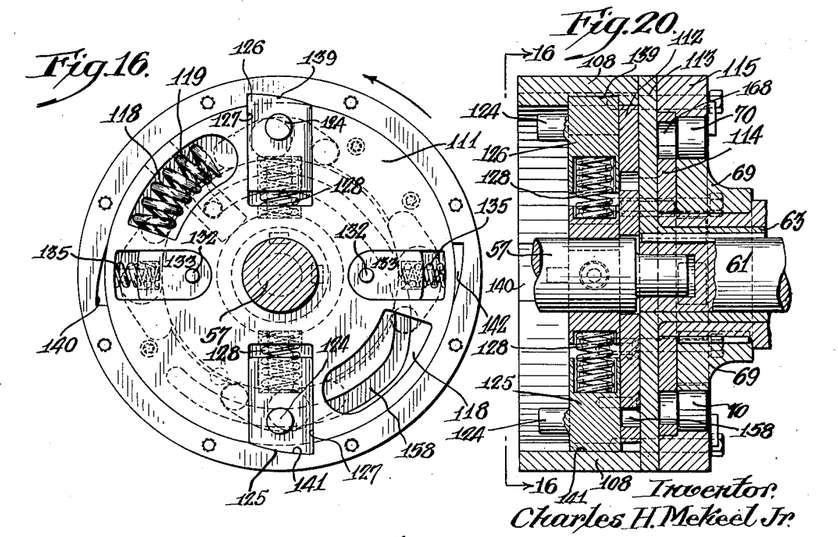
Figures 17, 18, 19 and 20 are sections upon lines 17—17, 18—18, 19—19 and 20—20 respectively of Figures 13, 14, 15 and 16.

During the final quadrant of relative movement, to high gear connection, pin 144 moves to the trailing, radially inner, end of slot 143 (Figures 8 and 12) and pin 164 then is located in the leading, radially inner, end 164 of slot 158 (Figures 16 and 20). Since both pin positions are near the cam axes both units or sets, A and B, are in clutched condition.

Since clutching and declutching functions are determined in both controls shown by the distance of driving and driven block pins from the axes of roller control cams 143 and 158, in each case the parts are declutched with the corresponding pin in the portion of its cam slot near the periphery, and clutched with the pin in a portion of the same cam slot near the axis. The three successive quadrants of relative movement between the pins and cams represent three lost motion quadrants of movement during which driving connection between the engine driving shaft and the distributing shaft is interrupted and the clutching or declutching is accomplished.

The two cam control mechanisms shown as operating from the momentum torque through the ratchet ring in changing from low to or toward high and from driving disc and latch carrier torque to change from high to or toward low to control respectively the clutched or declutched conditions of speed change units or sets A and B differ mainly as to their cam follower guides and roller release plates, in that with the control for set A the roller control pins which engage the clutch rollers to declutch are rigid with respect to the shaft, being mounted on the cam follower guide and the roller release plate is movable with the clutch ring, whereas in the control mechanism shown for set B the roller control pins are mounted upon the roller release plate which is movable with respect to the shaft of set B.

Either of these intermediate mechanisms could be used instead of the other for control of the clutching and declutching of either set. Both have advantages, the one applied to set A rolling the clutch ring rearwardly by cam 152 at the start of declutching to release the rollers from their clutching position, whereas that shown for set B has direct driving attachment of the shaft to the ratchet ring.

In Figures 24 and 26–29 the reversing control of the mechanism seen in Figure 2 is somewhat more fully illustrated. In addition to the reaction clutch-like brake for unit or set B having inner and outer races 87 and 88 and intervening rollers 89 intended to prevent reverse movement of the casing so as to require when the unit is declutched that the planetary gears serve a normal purpose of transmission by reason of rotation about their axes, there is a second brake corresponding generally with the reaction brake but having an opposite direction of braking action.

This second, reversing, brake is provided with inner race member 171 which is rigid with sleeve 84, outer race member 172 and intervening rollers 173. The slope of the clutch-like brake surface is of course opposite to that of the clutch-like brake surface in the reaction brake. The outer raceways of the two brakes are both formed in the housing.

The reaction brake, as in the case of the reaction brake for unit A, is operative to grip the inner brake surface 87 to the housing through outer race member 88 and thus to prevent casing movement in a direction opposite to that of braked rotation of the casing parts. This means that rollers 89, idle in one direction of movement, are set against the rearward movement of the casing which otherwise would take place when driving forward in reduction gear.

During forward driving the reaction brake idles and the reverse brake is released so that gear 81 and its sleeve rotate freely. The planetary gearing is not affected by the action of the reversing gear sun and planet. When the reversing gear operates, the reaction brake must idle during reverse movement of the shaft 80.

In order to take care of this situation reversing lever 174 is provided, rocking about any suitable part such as about shaft 80. It carries pins 175, reaching into both clutch-like brake races and in each race engaging one roller per pin. The pins pass through the roller spaces of both brake races so as to be used in the several positions of Figures 27 and 26, respectively, (a) to permit rollers 89 to be gripped in the reaction brake as in Figure 27, but to press rollers 173 in the reverse brake into neutral position where they are not free to have brake engagement, or (b) in Figure 26, to release rollers 173 and permit gripping of rollers 89.

The angular spacing between the biting surfaces of the outer raceways in the two brakes is preferably such that one set of rollers goes into engagement just when the other is released, with the intention and effect that the position of the reversing lever 174 controls which of the oppositely facing brakes is engaged and which is loose and that there shall be minimal intervening position.

It is the intention that one of these shall idle. When the reaction brake is engaged the driven reverse sun gear 81, its sleeve 84 and its flange rotate all the time during forward planet driving or revolve as a unit having shaft drive. During reverse driving the reaction brake must be released before the reverse brake is engaged.

When the reaction brake is released and the reversing brake is engaged, the unit B casing is released and is free to rotate in reverse; and this opposite direction of rotation of the casing is utilized to secure reverse of direction of drive.

As the casing 68 rotates gear 74 meshes about the stationary sun gear 81 with corresponding revolution of gear 73 about the axes of shafts 61 and 80. Since the planet is of different size than the planet 74 and the rate of rotation of planet 74 is set by engagement with sun 81 driving sun gear 79 will have a derived rate of rotation about the common axes determining the speed of reverse.

In Figure 25 the planets of the gears are arranged in sets of two as distinguished from sets of three in Figure 24, eliminating the reversing mechanism at this point as part of the planetary structure, and the reversing mechanism is located outside in an extension 176 of the housing. The shaft 80' carries gear 177 which meshes with a gear 178 upon jack shaft 179. The jack shaft is splined to a gear 180 which may have the same or different size according to whether it be the intention to alter the ratio of drive at the same time that the reverse takes place. Gear 180 meshes with an idling gear 181 which in turn meshes with gear 182 having bearing upon the shaft 183. A collar 184 splined to shaft 183 carries internally splined casings fitting either of gears 185 or 186. The collar can be shifted by any suitable means to drive shaft 183 in one direction or the other according to whether it engages clutch elements 185 or 186. The collar with its internal splines may be moved from one controlling position to the other, for example by a slidable rod 187 and a lever not shown.

It will be understood that in the successive changes in the relation of the parts, all of the parts have continued to turn in the same direction even though lost motion has permitted one group of parts to turn faster than another and later the other group has caught up with the first group. For convenience in Figures 5–20 the groups have been treated as if the ratchet ring remained still and the latch carrier moved with respect to it.

With the parts as seen in Figures 4, 5, 9, 13 and 17, the ratchet 126 engages notch 140 and the pin 144 lies in the end 147 of cam 143. This corresponds to an outer position of the pin 151 within slot 152. The rollers 156 are free to turn within the clutch ring 102.

Correspondingly the driven pin 159 within follower block 160 will lie in the trailing end of slot 158 and the driving follower block pin 145 will rest in the outer end of the roller release plate slot 166, see Figures 13 and 17. B will be connected for reduction drive.

If now the engine speed momentarily be reduced as by release of a car accelerator, so that the dominating torque is momentum torque from the mechanism driven, the clutch rings are clutched to their respective flanges, gripping by surfaces 157' and 170', respectively, because the flanges of the change speed units become drivers. The ratchet ring with its associated parts, roller control cam disc 112, cam follower guide 113, roller release plate 114 and clutch ring 115 will continue at their momentum speed whereas the latch carrier and the parts connected with and carried by it will tend to reduce in speed though still moving in the same direction.

The ratchet ring will over-ride the latch carrier and successively depress the latch blocks 125 and 126 so that latch block 126 will latch within recesses 141 (see Figures 6, 10, 14 and 18) 140 (see Figures 7, 11, 15 and 19) and 139 (see Figures 8, 12, 16 and 20) respectively. In the last position both units of change gears will be in direct drive.

If after any one of these successive quadrants of latch depression movement by momentum torque, engine torque becomes dominant, as by the operator's use of the accelerator, the gear connections will be those which correspond with the position of the latch 126 in the particular notch with which it is then related. In other words this momentum operated change from low to high, induced by release of the accelerator, can be stopped by the operator at either intermediate point by depression of the accelerator so as to make the engine drive dominant just after that point has been reached.

With the first quadrant momentum advance carrying the latch ring in the direction of travel, the latches 125 and 126 are depressed. They will be released from the then cooperating notches 140 and 142 and will advance with respect to the ratchet ring to the next notches. Meantime the noses of the latches will rub against the interior of the ring and the driving shaft will have lost-motion (non-driving) advance until the latches snap into the next notches 139 and 141. This progression and the position of pin 124 with respect to its operating cam are shown diagrammatically in the succession positions of Figure 23.

The pin 144 now rests at a point 148 in cam 143. Its movement has caused the driven pin 151 in the block 145 to move inwardly in cam 152 (Figures 6 and 10) pulling the roller release plate 103 ahead in the direction of motion and advancing the clutch ring 102.

Since the rollers started in declutched position no release of these rollers from their pin restraint is required and the advance of the ring hastens their clutching at the same time that movement of the clutch ring removes the restraint and allows them to clutch.

At the same time that this action is taking place clutching unit A, in unit B the pin 169 follows the path of the cam 167 one quadrant, which does not alter the distance of the pin and its block from the axis (Figures 14 and 18), maintaining its position as previously for declutching of the parts in unit B; with the result that no difference is made in the position of the clutch in unit B.

With the second quadrant of lost motion momentum torque advance of the ratchet ring and the parts connected with it, such that the latch 126 snaps into recess 140 in the ratchet ring (see Figures 7 and 11, 15 and 19), the pin 144 advances to position 149 in cam 143 which position 149 is located near the rim of the disc 107, at the same distance from the axis of the cam 143 as is the position 147, the result being that the cam follower block and roller release plate have been turned 180° as compared with Figure 4, but otherwise are the same for unit A as are seen in Figure 4. The clutch is released.

On the other hand the advance of latch 126 to engagement within ratchet ring recess 140 has shifted the position of pin 159 in cam 158 (Figures 15 and 19) by a half turn as compared with Figure 4, to a position where the cam lies close to the axis as compared to a cam position close to the circumference in the previous two locations of the parts. This results in pulling the block 160 in toward the axis of its guide and pressing driving pin 165 down in slot 168 to the inner end of this slot. This causes the roller release plate 114 to lag and release the pins 167 from their previous position holding the rollers 70 out of clutch engagement. This results in a clutched position for unit B.

When momentum torque carries the latch 126 around another (final) lost-motion quadrant to its "high" position, where the latch 126 fits within recess 139, the pin 144 fits within the trailing end 150 of cam 143. As a result the block 145 and the driving pin 151 carried by it again approach the axis, again causing angular advance movement, as distinguished from trailing roller-release movement of the plate and clutch ring when declutching, of the roller release plate through slot 152, Figures 8 and 12, and again permitting the rollers 156 to be clutched by the ring 102. This clutches the parts in set A.

Turning to the corresponding position of the control members affecting set B (Figures 16 and 20) when the ratchet 126 is in engagement within recess 139 the pin 159 in block 160 is now in the trailing end of the cam slot 158 which end is close to the axis, corresponding with its clutching position when the latch 126 engages within recess 140. There will therefore be no change in the condition of the parts effecting gear change in set B, and its parts will continue to be clutched.

In all of these movements last described the ratchet ring has acted as an overrunning clutch, has cam pressed the latch 126 down and has allowed it to snap up again successively, due to the sloping shape of the parts, permitting relative rotation between the latch carrier and ratchet ring in this direction; and that there has been no need or operation and no operation of the cam 122 upon the pins 124 and no compression of the circumferential springs 119 in the latch carrier. There has been compression of springs 128 beneath the latch blocks. This is because the clutch ring has pressed down the latch blocks successively without need for any latch block pin assistance.

The change from lower to higher gear can take place at any speed because no relative movement between the driving disc 109 and the latch carrier 111 is required and it makes no difference in this case whether the centrifugally operated pin 132 locking against relative movement of these two parts at high speed be in the inner or the outer part of its possible movement.

During the successive quadrant movements described or during the three engine-torque quadrant advances from high gear to low gear to be further described, the driving connections are interrupted and while the parts are free from strain the lost motion resetting of the clutch parts takes place.

In the declutching movement of roller release plate 103 by outward travel of pin 151 in slot 152 release of the rollers is assisted by the lagging turn given to the plate and clutch ring, which eases the previous engagement of the rollers, as affecting unit A whereas the fact that roller release plate 114 is not attached to the clutch ring 115 defeats any such rolling movement of the clutch ring to release the rollers as affecting unit B. The difference in operation is due to the fact that in one case the roller release plate is attached to the ring and in the other place is not. The need for release is much reduced both for momentum torque operation and for engine torque operation because the changes are effected during lost motion movement while the driving and driven shafts are disconnected.

The engine-torque-operated or controlled change mechanism by which the latch driving position with respect to the recesses in the ratchet ring advances under engine torque from connections with latch 126 in engagement with ratchet recess 139, corresponding to high gear, to the position shown in Figure 4, corresponding to low gear, differs from the momentum-torque operated or controlled mechanism used advance from low gear to high gear which has just been described and in which the ratchet ring depresses and passes the latches through the intermediate positions unless the progress be stopped at an intermediate position by applying engine torque. The difference arises chiefly because of the difference in relative directions of movement between the ratchet ring and the latch carrier and the consequent necessity for releasing the latches; also in the need for protection against change at higher speeds.

Assuming that latch 126 is in recess 139 and that the other latches, of which one other, 25, only is shown, are or is correspondingly seated in other recesses or recess, the action of the driving discs cam 122 is the same on all of the latches and will be applied to latch 26 in the figures.

The latch pins 124 are engaged within rests 123 of the cams, at the leading ends of the cams 122. The rest recesses are deep enough so that with the resistance to radial movement of the pins presented by springs 128 and the resistance to the angular movement of the pins represented by the necessary coincident additional compression of the circumferential springs 119, which would take place. Any movements of pins 124 would be diagonal, composites of radially inward and lagging circumferential movements. There will be considerable resistance to any such diagonal movements of pins 124 with respect to the rests in cams 121 with the result that the engine torque under which movement will start can be predetermined accurately.

In addition there is as a retarding force a very considerable frictional resistance of each of the faces 138 of each latch against the corresponding leading face of the ratchet recesses. These several resistances to initial movement of the pin can be started on its movement to withdraw latch 126 from engagement with its ratchet recess 139.

When the driving torque at any speed above low overcomes the frictional and spring resistances the latches are pulled down from their position seen at the left in Figure 23 to a point where they cease to engage the ratchet openings in which they have last rested.

During release movement pin 124 moves out of rest 123 and relative movement between the disc and latch carrier takes place using cams 122 to additionally compress the springs beneath the latches and opposing circumferential movement of the discs by circumferential springs 119. When the latches release the latch carrier jumps forward to the position at the left center in Figure 23, the latch noses pressing against the ring. As the latches move angularly within the ring (see right center in Figure 23) the spring 119 resets the disc and latch carrier with respect to one another and the latches then snap into the next ratchet openings.

The same means of withdrawing the latches operates for each latch advance, the parts passing from positions in high gear seen in Figures 8, 12, 16 and 20, through positions in Figures 7, 11, 15 and 19 corresponding to high intermediate, and in Figures 6, 10, 14 and 18 in low intermediate to low connections appearing in Figures 5, 6, 13 and 17.

Just in advance from low toward and into high connection through momentum torque which successively progresses the ratchet ring over the latches represents lost motion between the driven and drive shafts so also the advance of the latches from position in high, let us say, or an intermediate position to the next engagement of the latches with other recesses within the ratchet ring, represents lost motion and there is no driving connection between the two shafts during either of these lost motion movements.

Whether the lost motion occur by reason of momentum-torque-actuated release of the latches from the successive notches or recesses by cam action upon the latch ends or by engine-torque-actuated cam engagement with latch members to pull the latches down there is no driving work done during lost motion travel but in each case the parts are set by work done during the lost motion movement due to the changing angular relation of drive and driven parts.

The centrifugally operated locking mechanism against changing the gear relation at excessive speed is not operative if the driving disc has already started to move with respect to the latch carrier, because the lugs 132 are dependent upon smooth and easy entrance to the leading cam slots 130 and will not be in proper position to enter these slots. However, where an excessive speed has been reached before an attempt is made to alter the gear relation, entry of the pins 132 within slots 131 will bar speed change from a lower speed to a higher speed. However, since the change of speed by the momentum of normally driven parts merely depresses the latches 126, successively, without requiring any angular movement between the driving disc and latch carrier for such depressions, this centrifugal lock against gear shifting is not effective during transition from lower gearing to higher gearing.

It will be evident that the two change speed units have terminals facing toward each other adapted to be clutched or unclutched to determine the ratio of speed through the unit and an intermediate lost motion torque-operated clutching and declutching coupling for both units; with the result that engine drive passes through unit A to the coupling and by its torque determines the ratio of connections in unit A as well as in unit B and, in turn, momentum drive through unit B and the lost motion resetting mechanism of the coupling determines the speed ratio for unit B as well as for unit A. In other words in each case the torque, whether driving torque or momentum torque, operates through one of the units to effect by the coupling a change in speed ratio connections which affects both units.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:

1. In a torque-operated change speed mechanism, two change speed units terminating each in a shaft and a flange, the flanges facing each other, cams and connections adapted to lock each of the shafts selectively to the flange of its unit, causing direct drive through that unit, when locked, and torque-operated, step-by-step ratchet and latch lost motion connections between the cams whereby the cams move relatively to effect a sequence of locking and unlocking operations between the shafts and the respective flanges of their units, the sequence being determined by the cams.

2. In a torque controlled change speed mechanism, two change speed units having each two terminals, one terminal of each being a shaft, one a driving and the other a driven shaft, the other terminals of each being adapted to be locked to the shaft of that unit, cams and connections, one for each unit, controlling locking and unlocking of the units, and lost motion ratchet and latch torque operated connections between the cams, whereby with engine torque, lost motion occurs in one direction and with momentum torque lost motion occurs in the opposite direction, and the lost motion relative angular movement of the cams determines the sequence of lockings and unlockings of the units.

3. In a torque controlled change speed mechanism, two change speed units each having a shaft and each having a terminal adapted to be locked to the shaft of the corresponding unit, means for effecting the locking operation, cams and connections, one for each unit adapted to effect locking and unlocking for the corresponding lock unit, the relative angular relation between the cams determining the sequence of locking and unlocking operations upon the two units, rachet and latch connections between the cams, the angular relations of the cams being determined by the rachet and latch positions, the connections having resilient means between them and means within the connections for releasing the latch successively to turn the cams angularly step by step in one direction and permitting return to the original angular position.

4. In a torque controlled change speed mechanism, two change speed units having one a driving and the other a driven shaft and each a terminal adapted to be locked to the shaft of its unit, cams and connections, one for each unit adapted to effect locking and unlocking for the corresponding unit, the relative angular relation between the cams determining the sequence of locking and unlocking operations upon the two units, a driving disc connected with one of said shafts, a latch carrier having slight angular movement with respect to the driving disc, means between the driving disc and latch carrier whereby the latches are released, resilient retarding means opposing movement between the driving disc and latch carrier, a rachet connected with the other of said shafts and connections between the latch carrier and rachet and the respective cams.

5. In torque controlled clutching and declutching mechanism for gearing change, a ratchet ring, a driving disc and latch carrier rotatable within the ring and having independent rotary movement, a latch for the carrier, spring opposed release connections between the disc and latch, a cam turned by the latch carrier, a cam turned by the ratchet ring, clutch control connections for the two cams and change speed units having shaft terminals cooperating with the ring and latch carrier and other terminals operating with the clutch control connections, whereby clutching and declutching of the terminals of the units are effected.

6. In torque controlled clutching and declutching mechanism for gearing change, a ratchet ring, a driving disc and latch carrier rotatable within the ring and having independent rotary movement, a latch for the carrier, spring opposed release connections between the disc and latch, a cam turned by the latch carrier, a cam turned by the ratchet ring, clutch control connections for the two cams, change speed units having shaft terminals cooperating with the ring and latch carrier and other terminals operating with the clutch control connections, to cause clutching and declutching of the terminals of the units and centrifugally operated means for stopping relative movement between the driving disc and latch carrier above a predetermined speed to prevent speed change from being effected above said speed.

7. In a change speed mechanism adapted for torque control, a pair of change speed devices, shafts and flanges forming terminals for the devices, clutch mechanism for causing clutching and declutching of the terminals of each unit, separate cam means, including connections for operating the clutch mechanism, a ratchet movable with one cam, a latch carrier movable with the other cam, a driving disc connected with the shaft of one unit and movable with respect to the latch carrier, the ratchet being connected with the shaft of the other unit and driving torque operated, spring opposed latch retracting cam connections between the driving disc and the latch carrier.

8. In a speed changing construction, a pair of speed changing units each adapted to provide two speeds, having terminals to be connected and disconnected, one terminal of each being a shaft, a control unit having relatively angularly movable driving and driven mechanism connecting with the respective shafts and including latch and ratchet members between the two shafts which provides limited step-by-step angular movement, torque-operated means driven by one of the shafts to disengage the latches, said latches being reset by overrunning due to momentum torque, cams carried by the latch and ratchet members, respectively, and means operated by the cams whereby in the different angular positions of the cams the connecting and disconnecting operations are performed selectively.

9. In a torque-controlled change speed mechanism, a pair of change speed units having two shafts and two surrounding members one for each of the change speed units, clutches connected with the members and having rollers, revoluble pins engaging the rollers, radially movable cam means for revolving the pins, angularly movable cam means, one for each change speed unit for operation of the radially movable cams, and latch and ratchet lost motion means for supporting and relatively turning the angularly movable cam means.

10. A transmission comprising a ratchet, a latch carrier having a latch engaging the ratchet, the ratchet and latch being torque driven in directions angularly opposite during operation of the control, a spring tending to press the latch against the ratchet, a pin carried by the latch, a driving disc, cam connections between the disc and the pin, sun and carrier change speed units adapted to be locked in direct drive ratio or unlocked during angular movement between the ratchet and latches, angularly movable cams movable with the ratchet and latch carrier, respectively, and connections between the cams and units whereby the torque operation is made effective selectively to turn the ratchet and latch relatively, producing lost motion, and during the lost motion to lock in direct drive ratio or unlock the change speed units.

11. In operating mechanism for controlling change speed gearing, as a sub-combination, a normally driven shaft, a cam disc, a ratchet ring movable with the disc and connected with the shaft, a driving disc, latch carrier and control cam movable together within the ratchet ring, the driving disc lying adjacent the latch carrier and having slight circumferential movement with respect to it, resilient driving connection between the disc and carrier, a latch movable in the latch carrier, a spring pressing the latch to engagement with the ratchet ring, cam engaging surfaces between the driving disc and latch having a normal steep rest position, whereby movement between the disc and latch requires lifting the cam connections out of the rest and along a cam surface against the resilience of the driving engagement and against the pressure of the spring and a normally driving shaft connected with the driving disc.

12. In operating mechanism for controlling change speed gearing, as a sub-combination, a normally driven shaft, a cam disc, a ratchet ring movable with the disc and connected with the shaft, a driving disc, latch carrier and control cam movable together within the ratchet ring, the driving disc lying adjacent the latch carrier and having slight circumferential movement with respect to it, resilient driving connection between the disc and carrier, a latch block supported in the latch carrier, a pin carried by the block and a cam on the driving disc adapted to engage the pin and withdraw the latch to permit angular movement of the latch carrier with respect to the ratchet ring.

13. In operating mechanism for controlling change speed gearing, as a sub-combination, a normally driven shaft, a cam disc, a ratchet ring movable with the disc and connected with the shaft, a driving disc, latch carrier and control cam movable together within the ratchet ring, the driving disc lying adjacent the latch carrier and having slight circumferential movement with respect to it, resilient driving connection between the disc and carrier, an outwardly spring-pressed latch block supported in the latch carrier, a pin carried by the block, a cam on the driving disc adapted to engage the pin with circumferential movement of the driving disc with respect to the carrier and withdraw the latch to permit angular movement of the latch carrier with respect to the ratchet ring and centrifugally operated locking means engaging between the driving disc and the carrier preventing relative circumferential movement at excessive speed.

14. In a torque-operated speed control, two speed change gear units each terminating in a shaft and a flange adapted to be clutched to and declutched from the shaft, the one shaft being relatively a drive shaft and the other a driven shaft, a ratchet connected with one shaft, a revoluble latch carrier and latch within the ratchet connected with the other shaft, cam means connected with the driving shaft for releasing the latch successively to permit lost motion movement, cams rotatable with the ratchet and latch carrier, respectively, clutch rings adapted to engage the respective flanges and operating connections between the cams and rings whereby said shafts and flanges are clutched and declutched during lost motion movement of the cams and at the control of the cams rotating with the ratchet ring and latch.

15. In gear changing mechanism, a driving shaft, a driven shaft, a driving disc, a cam carried by the driving disc, a latch carrier having a guide extending toward and away from the axis of the latch carrier, a latch movable along the guide, a spring tending to press the latch outwardly in the latch carrier, a pin in the latch engaged by the driving disc cam to withdraw the latch, spring retarding means for opposing cam movement of the driving disc with respect to the latch carrier, a ratchet ring connected with the driven shaft, surrounding the latch carrier and having ratchet openings engaged by the latch, forming an overrunning connection in one direction of relative movement.

16. In gear changing mechanism as a sub-combination, a driving shaft, a driving disc connected therewith, a latch carrier, a spring pressed latch in said carrier, means for retracting the latch upon angular movement of the disc with respect to the carrier, spring means for opposing said angular movement and a ratchet ring movable with respect to the latch and having latch-and-ratchet connection therewith for step-by-step relative movement with successive retractions of the latch.

17. In gear changing mechanism, as a sub-combination a driving shaft, a driving disc connected therewith, a latch carrier, a spring pressed latch in said carrier, cam connections between the drive disc and the latch for retracting the latch upon angular movement of the disc with respect to the carrier, spring means for opposing said angular movement, a ratchet ring movable with respect to the latch and having latch-and-ratchet connection therewith for step-by-step relative movement with successive retractions of the latch and centrifugally operated means for preventing relative movement between the driving disc and latch carrier.

18. In gear changing mechanism, a driving shaft, a driving disc connected therewith, a latch carrier, a spring pressed latch in said carrier, cam connections between the drive disc and the latch for retracting the latch upon angular movement of the disc with respect to the carrier, spring means for opposing said angular movement, a ratchet ring movable with respect to the latch and having latch-and-ratchet connection therewith for step-by-step relative movement with successive retractions of the latch and centrifugally operated means for preventing relative movement between the driving disc and latch carrier, a roller-operating cam driven by the shaft, a cam follower guide connected with the ratchet ring, a driven shaft connected with the guide, a follower movable with respect to the guide, a roller release pin disc having a cam, connections between the follower and both cams, whereby movement of the block outwardly and inwardly in response to the one cam turns the disc, roller release pins carried by the disc, a clutch ring, a driven flange about the driven shaft and clutch members between the flange and ring released by the pins in one position of the parts.

19. In gear changing mechanism, a driving shaft, a driving disc connected therewith, a latch carrier, a spring pressed latch in said carrier, means for retracting the latch upon angular movement of the disc with respect to the carrier, spring means for opposing said angular movement, a ratchet ring movable with respect to the latch and having latch-and-ratchet connection therewith for step-by-step relative movement with successive retractions of the latch and centrifugally operated means for preventing relative movement between the driving disc and latch carrier, a roller-operating-cam driven by the shaft, a cam follower guide connected with the ratchet ring, a driven shaft connected with the guide, a follower movable with respect to the guide, a roller release pin disc having a cam, connections between the follower and both cams, whereby movement of the follower outwardly and inwardly in response to the one cam turns the disc, roller release pins carried by the disc, a clutch ring, a driven flange about the driven shaft and clutch members between the flange and ring released by the pins in one position of the parts.

20. In gear changing mechanism, a driving shaft, a driving disc connected with the driving shaft, a driven shaft, a latch carrier, a spring pressed latch in said carrier, cam connections between the driving disc and the latch for retracting the latch upon angular movement of the disc with respect to the carrier, spring means for opposing said angular movement, a ratchet ring movable with respect to the latch and connected with the driven shaft and having latch-and-ratchet connection therewith for step-by-step relative movement with successive retractions of the latch, a roller-operating-cam movable with one of the shafts, a cam follower guide connected with the other of the shafts, a follower movable with respect to the guide, a roller release pin disc having a cam, connections between the follower and both cams, whereby movement of the follower outwardly and inwardly in response to the one cam turns the disc, a flange, a clutch ring, roller release pins and support therefore movable with respect to the ring, and clutch members between the flange and ring released by the pins in one position of the parts.

21. In a torque-controlled speed change mechanism, a planetary gear having a shaft and a terminal adapted to rotate independently or to be clutched together for direct drive, an overrunning clutch ring and rollers comprising outer members for a clutch using the terminal as the inner member, revolubly supported pins adapted to engage the rollers to hold them in clutch release position, cam means for moving the pins with respect to the clutch ring, a sliding block operating the cam means, a cam and connections controlling the position of the block and torque-controlled ratchet and latch means for turning the cam to positions where the pins engage the rollers to release the rollers or do not engage the rollers.

22. In a torque-operated speed change mechanism, a speed changing unit having terminals comprising a shaft and a surrounding flange forming part of an overrunning clutch, an overrunning clutch ring and rollers within the ring engaging the flange, a cam plate secured to the ring and having a cam diagonal to the adjacent plate radii, pins on the plate adapted to control the rollers, a cam follower guide and block having a pin adapted to engage with said cam and torque-operated cam means for operating the block in the guide.

23. In a change speed mechanism, a change speed unit having terminals capable of rotation relatively for one speed ratio and adapted to be clutched together for direct drive and one of them comprising a clutch member, an overrunning clutch having rollers engaging said clutch member, revoluble roller-engaging pin means for holding the rollers out of clutching position, a cam follower guide, a follower carried by the guide and adapted to move inwardly and outwardly within the guide, a driving pin on the follower, an internal cam adapted to be engaged by the pin and to move the roller engaging pins annularly with respect to the rollers, a driven pin on the follower, a revoluble cam moving the driven pin and determining the position of the block, and torque-operated lost motion means for rotating the revoluble cam plate.

24. In a torque-operated speed control coupling, a drive shaft, a driven shaft, a change gear terminal movable about the driven shaft, a clutch ring and rollers adapted to engage the terminal to cause it to move at the same rate as the driven shaft, a clutch release plate movable angularly with respect to the clutch ring, a cam follower guide movable with the driven shaft, pins on the release plate adapted to engage the clutch rollers, a block movable toward and from the axis of the cam follower guide, and having cam slot engagement with the clutch release plate imparting rotation to the clutch release plate to declutch or clutch the terminal, ratchet and latch lost motion connections between the drive and driven shafts, torque-controlled means for releasing the latch and a cam rotating with the drive shaft changing the block position in the cam follower guide.

25. In a torque-controlled gear changing mechanism, two gear changing units each having a shaft and a cooperating flange adjacent to the shaft, adapted to be clutched together, for direct drive, or to be declutched and drive at another speed through the gear changing units, overrunning clutch members for the respective flanges and connected with the respective shafts, rollers between the flanges and clutch members, pins engaging the respective rollers to render the clutches inoperative and torque-controlled step-by-step latch connected lost motion coupling means for moving the pins angularly with respect to the overrunning clutch members.

26. In gear changing mechanism, a drive shaft, a clutch flange movable about the drive shaft, a drive disc, a cam carried by the driving disc, a latch carrier having a guide extending toward and away from the axis of the latch carrier, a latch movable along the guide, a spring tending to press the latch outwardly in the latch carrier, a pin in the latch engaged by the drive disc cam to withdraw the latch, spring retarding means for opposing rotary movement of the drive disc with respect to the latch carrier, a ratchet ring surrounding the latch carrier and having ratchet openings engaged by the latch, a driven shaft connected with the ratchet ring, a roller control cam driven by the ratchet ring, a cam follower guide driven by the driving shaft and having guide walls extending toward and away from the center of the guide, a block in said walls, engaging means between the block and the roller control cam to move the block, a roller release pin in one face of the block, a roller released by the pin, a roller release plate adjacent the cam follower guide and having a cam slot, engaged by the pin, whereby movement of the block in and out causes relative angular movement of the roller release plate, pins carried by the cam follower guide and passing through the roller release plate, a clutch ring about the clutch flange and rollers inside the clutch ring engaged by the release pins to render the rollers inoperative for clutch purposes.

27. In a speed changing mechanism having angularly rotatable parts in line, ratchet mechanism for driving one part upon rotary movement of the other, means for successively releasing the ratchet connection to provide step-by-step lost motion angular movement between them and centrifugally operated control mechanism for preventing the step-by-step movement.

28. In a change speed gear, a coupling having driving and driven shafts and ratchet and latch lost motion connections between the shafts, cams driven by the shafts and angularly moved with respect to each other during the lost motion movement and clutches operated by the cams, in combination with two change speed units having facing terminals, one of which in each unit is rigid with one of the coupling shafts and the other of which is a unit terminal to be clutched to the coupling shaft, whereby engine drive through one of the units reacts upon this unit to change its speed ratio and momentum drive from the driven parts through the other unit reacts upon this other unit to alter its speed ratio.

29. A change speed gear mechanism comprising a pair of change speed gear units having shaft and casing terminals facing each other and adapted to be clutched, a shaft and its casing, one to the other, and a coupling between the terminals, including ratchet and latch connections with the shaft, the ratchet overrunning the latch with momentum drive, driving means within the connections for retracting the latch with engine drive, cams moving with the ratchet and latch and clutch connections with the ratchet and latch cams, respectively, for clutching and declutching the respective terminals, whereby with engine drive the latch is retracted step-by-step to alter the cam relation for clutching and declutching operations at the two units, and with momentum drive the overrunning ratchet resets step-by-step the cam relations determining the clutching and declutching respectively.

30. In a change speed driving mechanism, a coupling having terminal shafts, intermediate ratchet and latch carier torque-operated lost motion connections between the shafts, the ratchet and latch carrier, respectively being driven by the shafts, means for withdrawing the latch successively, located in the driving connection of the latch carrier and its shaft, clutches for the coupling, cams and connections controlled by the latch and ratchet positions for setting and releasing the clutches and change speed gear units connected with the coupling shafts respectively and having terminals facing the coupling adapted to be clutched to and declutched from the coupling shafts in conformity with the positions of the cams.

31. Two change speed gear units having shafts and terminals adapted to be clutched with respect to the shafts, ratchet and latch lost motion connections between the shafts, latch-withdrawing means within the connections, cams driven by the ratchet and latch respectively and clutching and declutching mechanism for the units operated by the cams.

32. In change speed gearing, a pair of planetary units in series having shafts in line and casing terminals facing each other, clutches connected with the shafts of the units and clutching and declutching to and from the casing terminals and torque-controlled lost motion mechanism between the shafts, operative directly as distinguished from operating through centrifugal means, to engage and disengage the clutches with the casing terminals to increase or decrease the gear ratio.

CHARLES H. MEKEEL, Jr.